(12) United States Patent
Boese et al.

(10) Patent No.: US 8,103,067 B2
(45) Date of Patent: Jan. 24, 2012

(54) ANALYSIS METHOD FOR IMAGE DATA RECORDS INCLUDING AUTOMATIC SPECIFICATION OF ANALYSIS REGIONS

(75) Inventors: Jan Boese, Eckental (DE); Estelle Camus, Mountain View, CA (US); Marcus Pfister, Bubenreuth (DE); Thomas Redel, Poxdorf (DE)

(73) Assignee: Siemens Aktiengesellschaft, Munich (DE)

( * ) Notice: Subject to any disclaimer, the term of this patent is extended or adjusted under 35 U.S.C. 154(b) by 899 days.

(21) Appl. No.: 11/821,054

(22) Filed: Jun. 21, 2007

(65) Prior Publication Data

US 2007/0297678 A1    Dec. 27, 2007

(30) Foreign Application Priority Data

Jun. 22, 2006   (DE) .......................... 10 2006 028 646

(51) Int. Cl.
*G06K 9/00* (2006.01)
*G06K 9/34* (2006.01)

(52) U.S. Cl. ........ 382/128; 382/130; 382/164; 382/173; 382/180

(58) Field of Classification Search .................. 382/128, 382/130, 164, 173, 180
See application file for complete search history.

(56) References Cited

U.S. PATENT DOCUMENTS

| 6,236,770 | B1 * | 5/2001 | Hsieh et al. | 382/312 |
| 6,603,880 | B2 * | 8/2003 | Sakamoto | 382/173 |
| 6,728,400 | B1 * | 4/2004 | Matsugu | 382/164 |
| 7,221,787 | B2 * | 5/2007 | Luo et al. | 382/132 |
| 7,496,217 | B2 * | 2/2009 | Tank | 382/128 |
| 7,627,175 | B2 * | 12/2009 | Le Clerc et al. | 382/173 |
| 2003/0068084 | A1 * | 4/2003 | Kinjo et al. | 382/164 |
| 2005/0259854 | A1 * | 11/2005 | Arimura et al. | 382/130 |
| 2007/0292011 | A1 * | 12/2007 | Nishimura et al. | 382/128 |
| 2008/0095439 | A1 * | 4/2008 | Okubo | 382/180 |

FOREIGN PATENT DOCUMENTS

| DE | 100 26 700 A1 | 12/2001 |
| DE | 102004060396 A1 | 7/2005 |
| DE | 102005039189 A1 | 2/2007 |
| JP | 09285465 A | 11/1997 |

OTHER PUBLICATIONS

Machine Translation of German Patent No. DE10026700.*
Communication from the German Patent Office, Aug. 20, 2011, pp. 1-4.

* cited by examiner

*Primary Examiner* — Brian Werner
*Assistant Examiner* — Uptal Shah (57) ABSTRACT

There is described an analysis method for at least one image data record of an examination object, wherein each image data record features a multiplicity of image data elements. A position in a multidimensional space is assigned to each image data element. Each image data element features an image data value. The image data values of positionally corresponding image data elements of the image data records are specified by means of at least essentially positionally identical regions of the examination object. A computer automatically divides the image data records into empty regions and signal regions, applying an overall assignment rule which is based on the image data values of the image data elements of a plurality of image data records, such that each image data element of each image data record is assigned to either its empty region or its signal region. For each image data record, the computer automatically determines a closed outline which fully contains the signal region of the relevant image data record and, on the basis of the closed outline of the relevant image data record, determines an analysis region such that a further analysis of the relevant image data record can be restricted to its analysis region.

21 Claims, 8 Drawing Sheets

ANALYSIS METHOD FOR IMAGE DATA RECORDS INCLUDING AUTOMATIC SPECIFICATION OF ANALYSIS REGIONS

CROSS REFERENCE TO RELATED APPLICATIONS

This application claims priority of German application No. 10 2006 028 646.4 DE filed Jun. 22, 2006, which is incorporated by reference herein in its entirety.

FIELD OF INVENTION

The present invention relates to an analysis method for image data records of an examination object, wherein each image data record features a multiplicity of image data elements, wherein a position in a multidimensional space is assigned to each image data element and each image data element features an image data value, wherein the image data values of positionally corresponding image data elements of the image data records are specified by means of at least essentially positionally identical regions of the examination object.

Furthermore, the present invention relates to a data medium on which a computer program is stored, wherein the computer program causes such an analysis method to be executed by a computer when the computer program is loaded into the computer and executed by the computer. Finally, the present invention relates to a computer which features a mass storage in which such a computer program is stored.

Analysis methods of the above-cited type and the corresponding computer programs are generally known.

BACKGROUND OF THE INVENTION

DE 100 26 700 A1 discloses an analysis method for an image data record which features a multiplicity of image data elements, wherein each image data element is assigned a position in a two-dimensional area and each image data element features an image data value. A computer, using an assignment rule which is based on the image data values of the image data elements of the image data record, divides the image data record into an empty region and a complementary signal region. By virtue of the manner in which the signal region is determined, the signal region is a closed outline. At the same time, it corresponds to an analysis region in which the image data record is analyzed.

Analysis methods for image data records of an examination object—often a human being—are used in many applications, inter alia the analysis of medical images. A typical example of a medical application relates to image data records showing blood vessels and tissues which are supplied by the blood vessels, wherein a contrast means is injected into the blood. Such image data records are used e.g. in the case of angiographic examinations of the human brain or the human heart.

In the simplest case, the image data records are output to an operator (e.g. a doctor).

In a multiplicity of cases, however, a computer carries out analyses of the image data records. On the basis of a chronological sequence of the image data records, for example, the computer can perform a perfusion analysis of the tissue which is supplied with blood. On the basis of an analysis of the chronological sequence of the image data records, for example, it is also possible to specify a flow speed of the blood in the vessels.

It is possible for the analysis—designated as "further analysis" in the present invention—to be carried out in the whole image data records. This approach has the advantage of being relatively simple. However, it has the disadvantage that the analysis is often carried out to a considerable extent in regions of the image data records which are irrelevant with regard to the desired analysis. The disadvantage is even more serious because the analysis is often very computer-intensive and medical emergencies are concerned in many cases. In the context of emergency medical assistance, however, minutes or even several seconds can decide between life and death in individual cases.

It is also possible for the operator to preset an analysis region (often designated as ROI=region of interest) for the computer, and for the computer to restrict the analysis to the analysis region. This approach already represents an improvement, because the time-intensive analysis now only needs to be carried out in the analysis region. However, serious disadvantages remain or now arise as a result of this approach.

For example, time is required for the presetting of the analysis region, such that the time saving is suboptimal. This applies in particular if the operator must preset a separate analysis region for each image data record or if the presetting of the analysis region is difficult, e.g. because the required analysis region can only be specified on the basis of the totality of the image data records. Furthermore, the presetting of the analysis region by the operator is susceptible to error and often suboptimal. This applies in particular if the operator is relatively inexperienced. The presetting also places a physical or psychological stress on the operator.

SUMMARY OF INVENTION

An object of the invention is to find an analysis method for image data records of an examination object, by means of which it is possible automatically to determine the analysis regions of the image data records.

The object can be solved by an analysis method having the features in the independent claim. It is further solved by a data medium, wherein the computer program causes a computer to execute the analysis method when the computer program is loaded into the computer and executed by the computer. Finally, the object can be solved by a computer featuring a mass storage in which such a computer program is stored, such that the computer executes such an analysis method after the computer program is invoked.

According to the invention, a computer automatically carries out the following measures for each image data record:

It divides the relevant image data record into an empty region and a signal region, applying an overall assignment rule which is based on the image data values of the image data elements of a plurality of image data records, such that each image data element of the relevant image data record is assigned to either the empty region or the signal region.

It determines a closed outline which fully contains the signal region of the relevant image data record.

On the basis of the closed outline of the relevant image data record, it determines an analysis region such that a further analysis of the relevant image data record can be restricted to its analysis region.

In straightforward cases, it can be sufficient for the computer to determine a characteristic value for each image data element of an image data record independently of the other image data elements of the relevant image data record, to decide whether to assign the relevant image data element to a temporary empty region or to a temporary signal region on the basis of the characteristic value, and to determine the empty region and the signal region on the basis of the temporary empty regions and the temporary signal regions. The computer can determine the signal region by means of the intersection or the grouping of the temporary signal regions, for example. The computer can determine the empty region in a complementary manner.

For example, the computer can determine the characteristic value for each image data element of an image data record independently of the image data values of the other image data elements of the relevant image data record. Alternatively, the computer can determine a test region in each case for the image data elements of the image data records, and determine the characteristic values which lie in the relevant test region on the basis of the image data values of the image data elements of the image data records. This approach is more computer-intensive, but produces more accurate results. In particular, individual "outliers" can be eliminated.

In the context of the last-cited approach, the test region is preferably greater than one in each dimension of the image data records.

As an alternative to a separate decision for each individual image data element, it is possible for the computer to divide the relevant image data record into test regions, to determine a characteristic value for each test region, to decide whether to assign the relevant test region to a temporary empty region or a temporary signal region on the basis of the characteristic value, and to determine the empty region and the signal region on the basis of the temporary empty regions and the temporary signal regions. This approach requires significantly less computing time. It is likewise possible here for the computer to determine the signal region by means of the intersection or the grouping of the temporary signal regions. The computer can determine the empty region in a complementary manner.

It is possible for each test region in each dimension of the image data records to be greater than one. Alternatively, it is possible for the test regions to have a measurement of one in at least one transverse direction of the multidimensional space.

It is possible for the test regions in at least one longitudinal direction to extend over a partial length of the multidimensional space. They preferably extend over the whole multidimensional space in the longitudinal direction. In this case, the projection results in a new data record of limited dimensionality being generated. The longitudinal direction can be orthogonal in relation to the transverse direction. The image data records are usually two-dimensional. In this case, the last-cited approach causes a reduction by one dimension to one dimension ("2−1=1"). Alternatively, the image data records can be three-dimensional. In this case, the result is either a reduction by one dimension to two dimensions ("3−1=2") or a reduction by two dimensions to one dimension ("3−2=1").

The test regions preferably correspond to each other over multiple image data records. A uniform approach for all image data records is therefore possible.

Using the last-cited approach, it is also possible for the computer to specify one of the image data records as a reference image data record for each image data record, to determine a region value for each test region of each image data record on the basis of the image data values of the image data elements of the relevant test region, and to determine the characteristic value for each test region on the basis of the region values of the relevant test region of the relevant image data record and of the region value of the corresponding test region of the reference image data record. This approach can be significantly more computationally efficient than, as previously, establishing a relationship between the image data records and their reference image data records.

Alternatively, it is possible for the computer to specify one of the image data records as a reference image data record for each image data record, and to determine the characteristic values of the relevant image data record on the basis of the image data elements of the relevant image data record and of the reference image data record.

When a reference image data record is specified, it is possible for the computer to specify the reference image data record for all image data records uniformly. Alternatively, the computer can specify the reference image data record for each image data record individually. As a rule, the computer compares the characteristic values with at least one threshold value. The computer preferably determines the at least one threshold value automatically on the basis of the image data values of the image data elements of the image data records.

In order to optimize the approach according to the invention, the computer preferably registers the image data records relative to each other. However, this measure can be omitted in individual cases.

It is possible for the computer to determine at least two temporary closed outlines per image data record, and to determine the closed outline on the basis of the temporary closed outlines.

It is likewise possible for the computer to determine at least two temporary analysis regions per image data record, and to determine the analysis region on the basis of the temporary analysis regions.

It is possible for the computer to determine individually the respective signal region for each image data record, to determine individually the respective closed outline on the basis of the individually determined signal region, and to determine individually the corresponding analysis region on the basis of the individually determined closed outline. Alternatively, it is possible for the analysis region for all image data records to be specified uniformly.

If the image data records form a chronological sequence, it is further possible for the computer to determine the respective analysis region for a specific one of the image data records on the basis of the signal region of the specific image data record and of the signal regions of the image data records which lie chronologically before or chronologically after the specific image data record.

BRIEF DESCRIPTION OF THE DRAWINGS

Further advantages and details are derived from the following description of exemplary embodiments in conjunction with the drawings. In the form of schematic representations.

DETAILED DESCRIPTION OF INVENTION

According to FIGS. 1 to 7, a sequence of image data records 1 to 7 of an examination object consists of a number images, e.g. 7 images here, said sequence being the subject of analysis. They show the introduction of a contrast means into a blood vessel system of an examination object and the rinsing out of the contrast means from the blood vessel system.

The image data records 1 to 7 represent a chronological sequence in the present case. However, the fact that the image data records 1 to 7 form a chronological sequence is of lesser importance in the context of the present invention.

Figure 1:
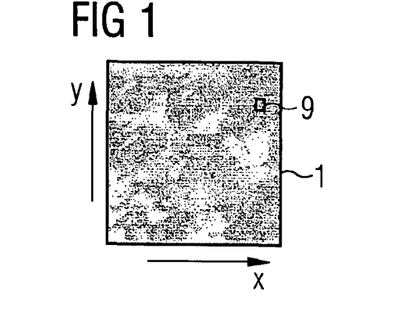
FIGS. 1 to 7 show image data records.

In the case of the first image data record 1 illustrated in FIG. 1, no contrast means are present in the examination object. This image shows only the background.

Figure 2:
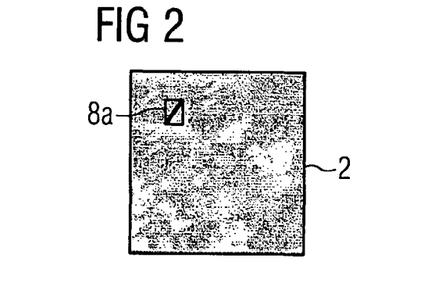

In the case of the second image data record 2 illustrated in FIG. 2, the supply of the contrast means was started at a supply point a short time previously. A short section of an artery of the examination object is therefore already filled with contrast means. The filled artery section is marked as a short thick path in FIG. 2.

Figure 3:
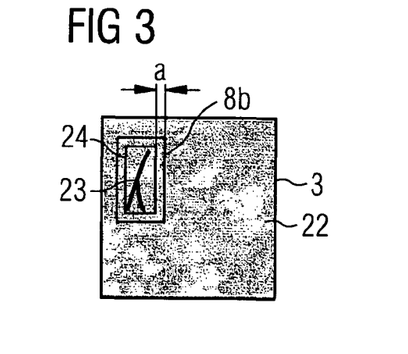
Figure 4:
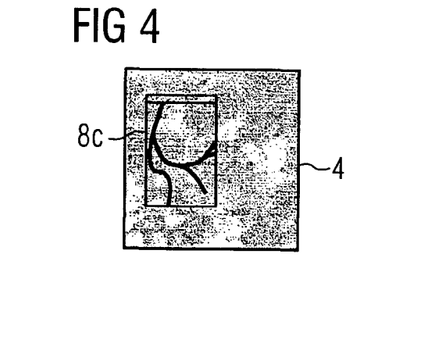
Figure 5:
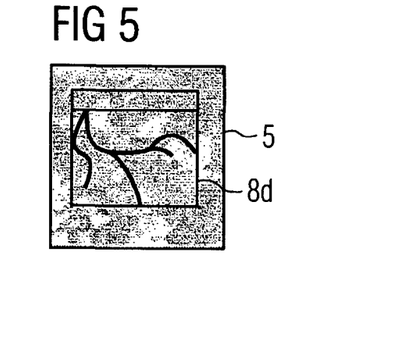
Figure 6:
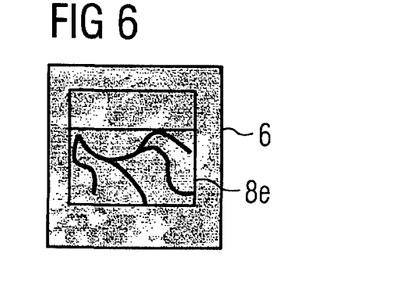

In the case of the third image data record 3 illustrated in FIG. 3, the supply of the contrast means was terminated immediately beforehand. In this image data record, the contrast means has already spread in the vascular system, but has not yet entered the whole vascular system.

In the case of the image data records 4 to 7 illustrated in FIGS. 4 to 7, no further supply of the contrast means has taken place. The contrast means gradually reaches the parts of the vascular system which are further away from the supply point. The contrast means is gradually rinsed out of from parts of the vascular system lying closer to the supply point.

In the context of medical examinations, often only that region into which contrast means are introduced is relevant. Analysis regions of the image data records 1 to 7, in which analyses of the image data records 1 to 7 take place, should on one hand therefore encompass the whole of the region which is filled by contrast means. On the other hand, the analysis regions should include the smallest possible number of regions which are useless in the medical sense. The reason for this is that the medical analyses are often very computer-intensive. Examples of possible analysis regions are marked in FIGS. 2 to 7 and designated by the reference number 8. In order to allow subsequent differentiation between different analysis regions 8, the lower-case letters a to g are added to the analysis regions 8 in FIGS. 2 to 7.

According to FIGS. 1 to 7, two-dimensional image data records are used as image data records 1 to 7. This is because such image data records can be represented better in figures. Alternatively, the image data records 1 to 7 could be three-dimensional image data records, i.e. volume reconstructions of the examination object.

The structure of the image data records 1 to 7 is explained in greater detail below in conjunction with FIG. 1. The following statements made in conjunction with FIG. 1 concerning the structure of the image data records 1 to 7 are valid for all image data records 1 to 7.

According to FIG. 1, each image data record 1 to 7 features a multiplicity of image data elements 9. Each image data element 9 is assigned a position in a multidimensional space. In the present case, in which the image data records 1 to 7 are two-dimensional data records, the associated space is also two-dimensional. The position of a specific image data element 9 is therefore specified by two position coordinates x, y. Image data elements of two-dimensional image data records are normally called pixels.

As mentioned above, the image data records could be three-dimensional image data records. In this case, the associated space would also be three-dimensional. In this case, three position coordinates x, y, z would be required for the position specification. The image data elements of three-dimensional spaces are normally called voxels.

Each image data element 9 features an image data value. The image data value lies between a minimal value (e.g. zero) and a maximal value (e.g. $255=2^8-1$).

Image data elements 9 of the image data records 1 to 7, which feature the same position coordinates x, y, correspond to each other positionally. It is clear from FIGS. 2 to 7—and also valid for FIG. 1—that the image data values of positionally corresponding image data elements 9 of the image data records 1 to 7 are specified by at least essentially positionally identical regions of the examination object.

If the examination object is an immobile examination object (e.g. the human brain), the image data values of the positionally corresponding image data elements 9 can be specified by means of exactly positionally identical regions of the examination object. If the examination object is a moving examination object (e.g. the human heart), the correspondence of the positional regions of the examination object is usually only approximate.

Figure 8:
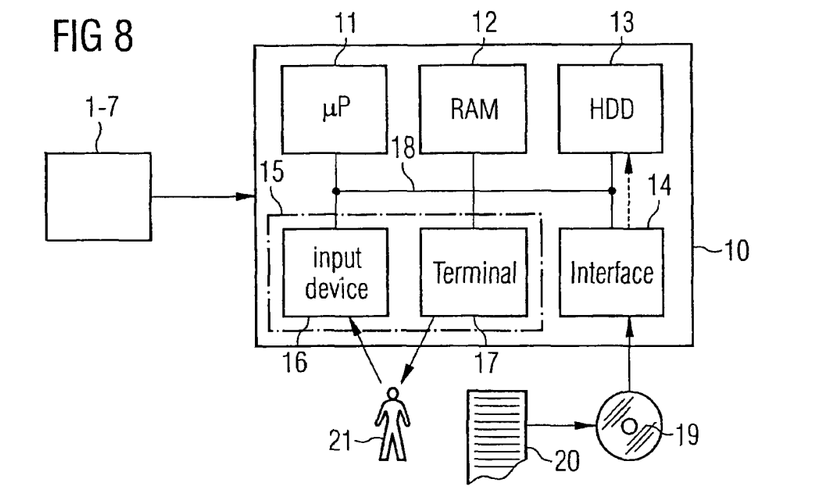
FIG. 8 shows a block schematic diagram of an analysis entity.

The image data records 1 to 7 and information which is assigned to the image data records 1 to 7 (e.g. the recording instants of the image data forming the basis of the image data records 1 to 7) are supplied to a computer 10 in accordance with FIG. 8. The computer 10 analyzes the image data records 1 to 7. Inter alia, the computer 10 features a processing unit 11 (e.g. a powerful microprocessor 11), a working memory 12, a mass storage 13, a data interface 14 and a human-computer interface 15. The human-computer interface 15 features an input entity 16 and at least one display device 17. The individual elements 11 to 17 of the computer 10 are connected together via a bus structure 18.

A computer program 20 is stored on a data medium 19. The computer program 20 contains control instructions which can be executed by the computer 10. The data medium 19 is linked up to the computer 10 via the data interface 14. The computer program 20 is read from the data medium 19 and is transferred into the mass storage 13, where it is stored. As a result of corresponding instructions from an operator 21, the computer program 20 which is stored in the mass storage 13 is loaded into the working memory 12 and executed. As a result of the execution of the computer program 20, the computer 10 executes an analysis method for the image data records 1 to 7, said method being explained in greater detail below in conjunction with the further figures—initially only FIG. 9.

Figure 9:
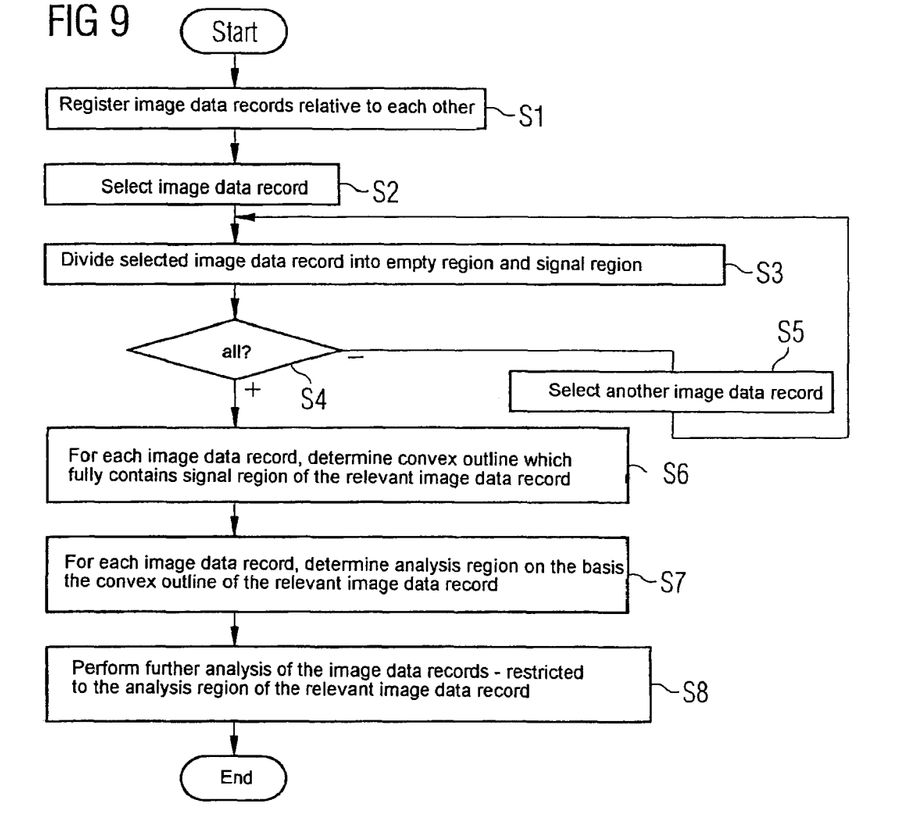
FIGS. 9 to 11 show flow diagrams.

The computer 10 executes the method which is described in FIG. 9—including the variants of said method as described in conjunction with FIGS. 10 to 22—automatically.

In accordance with FIG. 9, the computer 10 registers the image data records 1 to 7 relative to each other in a step S1. Registration methods for image data records are generally known to experts. Therefore there is no need to explain them in greater detail below.

The step S1 is usually executed. However, it can be omitted if the image data records 1 to 7 are analyzed independently of each other or if the registration of the image data records 1 to 7 is ensured in another way.

In a step S2, the computer 10 selects one of the image data records 1 to 7. In a step S3, the computer 10 divides the selected image data record 1 to 7 into an empty region 22 and a signal region 23 (see image data record 3 by way of example).

The division of the selected image data record 1 to 7 is complementary. Each image data element 9 of the selected image data record 1 to 7 is therefore assigned to either the empty region 22 or the signal region 23. The intersection of empty region 22 and signal region 23 is empty; the grouping produces the whole image data record 1 to 7.

Possible embodiments of the step S3 are explained in greater detail further below. However, it is mentioned at this point that the computer 10 performs the assignment of the image data elements 9 to the empty region 22 or to the signal region 23 using an overall assignment rule which is based on the image data values of the image data elements 9 of the image data records 1 to 7.

In a step S4, the computer 10 checks whether it has already performed the division into the empty region 22 and the signal region 23 in respect of all image data records 1 to 7. If the result of the check in the step S4 is negative, the computer 10 proceeds to a step S5 in which it selects another of the image data records 1 to 7. It then returns to the step S3.

If the result of the check in the step S4 is positive, i.e. the computer 10 has already divided all image data records 1 to 7 into their empty region 22 and their signal region 23, the computer 10 proceeds to a step S6. In the step S6, the computer 10 determines a closed outline 24 for each image data record 1 to 7 (see FIG. 3 by way of example). The computer 10 determines the closed outline 24 in the context of the step S6, such that the closed outline 24 fully contains the signal region 23 of the relevant image data record 1 to 7.

The closed outline 24 is preferably specified such that it forms a polygonal progression, wherein the vertices and/or the connecting lines between two vertices of the polygonal progression include in each case at least one point of the signal region 23. In particular, it can take the form of a convex outline 24.

Methods for determining the closed outline 24 are generally known to experts. Therefore there is no need to explain them in detail in the context of the present invention.

In a step S7, the computer 10 determines the analysis region 8 for each image data record 1 to 7 on the basis of the closed outline 24 of the relevant image data record 1 to 7. For example, the computer 10 can specify the analysis region 8 such that the closed outline 24 is completely contained in the analysis region 8 and maintains a minimum distance a from the border of the analysis region 8 (see FIG. 3).

Depending on the specification method, signal regions 23 can already have a closed contour or not. The closed outlines 24 and the analysis regions 8 are permanently closed. The closed outlines 24 and the analysis regions 8 can alternatively be polygonal progressions or smooth curves (e.g. circles, ellipses or ovals).

In a step S8, the computer 10 performs a further analysis of the image data records 1 to 7. This analysis is the actual useful analysis, e.g. a perfusion analysis or a vascular segmentation. Other analyses are also possible. As a result of the preceding steps S1 to S7, the computer 10 is able to restrict the further analysis of the image data records 1 to 7 in the step S8 to the analysis regions 8 of the image data records 1 to 7.

In conjunction with the FIGS. 10 to 18, a plurality of possible embodiments of the step S3 in FIG. 9 are explained in greater detail below.

Figure 10:
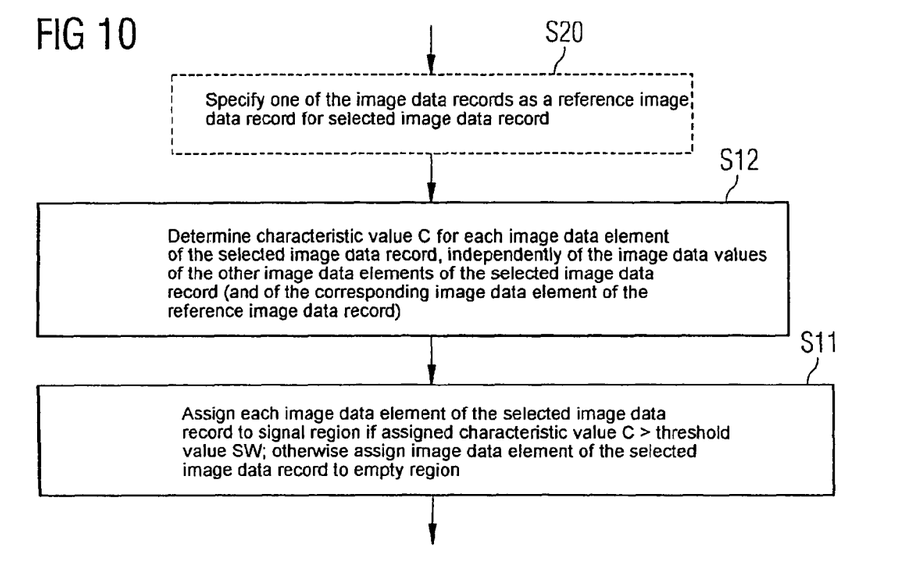
Figure 11:
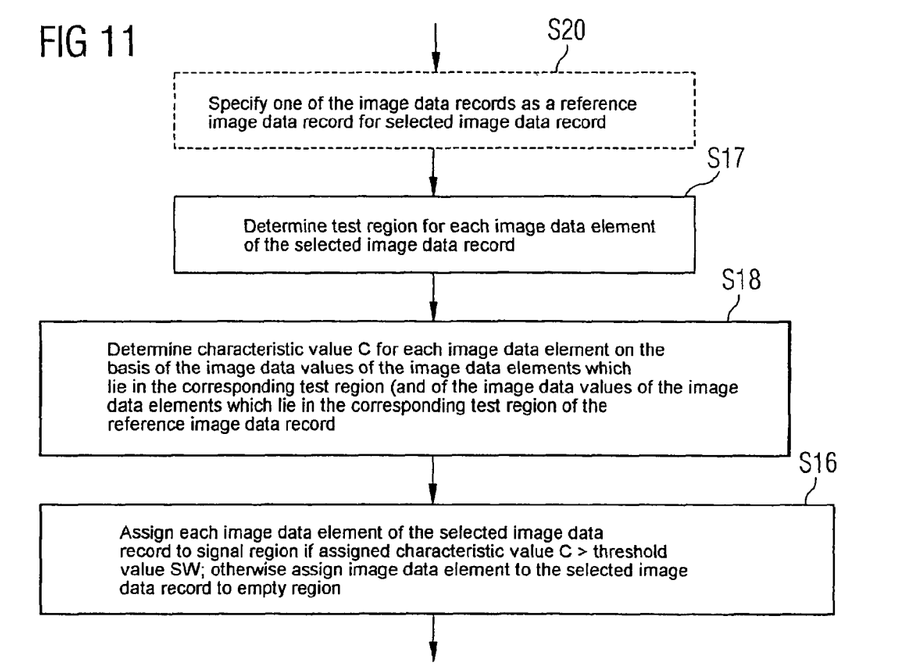

According to the FIGS. 10 and 11, in simple cases the computer 10 can decide in a step S11 or S16, for each image data element 9 of the selected image data record 1 to 7 and independently of the other image data elements 9 of the selected image data record 1 to 7, whether to assign the relevant image data element 9 to the empty region 22 or the signal region 23. In both cases (i.e. either both in the embodiment according to FIG. 10 and in the embodiment according to FIG. 11), the computer 10 determines a characteristic value C which is characteristic for the relevant image data element 9. The computer 10 compares the characteristic value C with a threshold value SW in the context of the step S11 or S16.

Depending on the result of the comparison, the computer 10 assigns the relevant image data element 9 to the empty region 22 or to the signal region 23.

According to FIG. 10, in the step S11 the computer 10 uses the image data value of the relevant image data element 9 itself as characteristic value C. In this case, in a step S12 the computer 10 determines the characteristic value C for each image data element 9 of an image data record 1 to 7 independently of the image data values of the other image data elements 9 of the relevant image data record 1 to 7.

Figure 12:
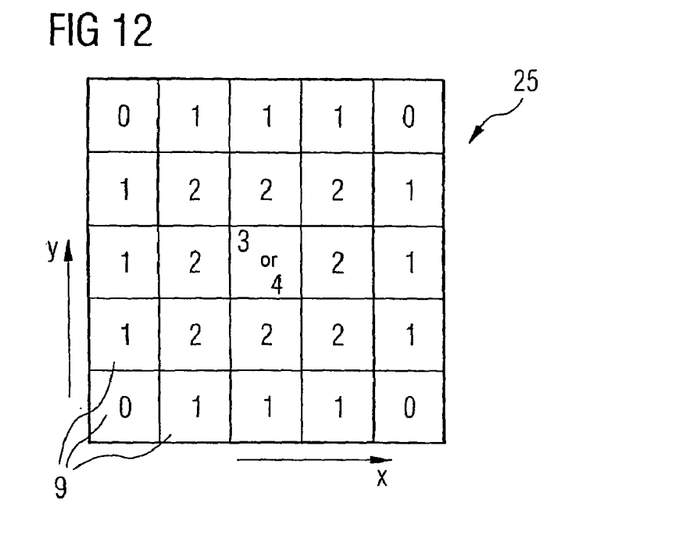
FIG. 12 shows an extract of an image data record.

According to FIG. 11, in a step S17 before the execution of the step S16, the computer 10 determines a corresponding test region 25 for each image data element 9 of the selected image data record 1 to 7. The test region 25 for a specific image data element 9 can contain e.g. all image data elements 9 which are arranged within a predetermined radius around the image data element 9 which defines the test region 25. FIG. 12 shows such a test region 25 by way of example.

According to the above-described preferred embodiment of the test region 25, the test region 25 is greater than one in each dimension of the image data records 1 to 7. Such an embodiment is preferred but is not obligatory.

After the execution of the step S17, in a step S18 for each image data element 9, on the basis of the image data values of the image data elements 9 which lie in the corresponding test region 25, the computer 10 determines the characteristic value C for the image data element 9 which defines the test region 25. For example, for each image data element 9, the computer 10 can determine as a characteristic value C the maximum, the unweighted mean value or a weighted mean value of the image data elements 9 which are arranged in the corresponding test region 25. If a weighted mean value must be determined, FIG. 12 shows possible weighting factors by way of example.

According to the previous embodiments for the FIGS. 10 and 11, the assignment of the image data elements 9 to the empty region 22 or to the signal region 23 takes place exclusively on the basis of the image data values of the image data elements 9 of the selected image data record 1 to 7. This approach can be sufficient. However, this approach is often improved if a step S20 is inserted before the steps S12 or S17 and the steps S12 or S18 are modified accordingly.

The step S20 is only optional. It is therefore only marked by means of a broken line in the FIGS. 10 and 11. The modifications to the steps S12 and S18 are also only optional. They are therefore placed in parentheses in the steps S12 and S18.

If the step S20 is present, in the step S20 the computer 10 specifies one of the image data records 1 to 7 as a reference image data record for the selected image data record 1 to 7. For example, the computer 10 can specify the image data record 1 from FIG. 1 as a reference image data record for all image data records 1 to 7.

In the modified step S12, the computer 10 determines the characteristic value C of the relevant image data element 9 on the basis of the image data values of the relevant image data element 9 of the selected image data record 1 to 7 and of the corresponding image data element 9 of the reference image data record. In the modified step S18, for each image data element 9, the computer 10 determines the characteristic value C on the basis of the image data values of the image data elements 9 which are located in the test region 25 of the relevant image data element 9 of the selected image data record 1 to 7, and on the basis of the image data values of the image data elements 9 which are located in the test region 25 of the corresponding image data element 9 of the reference image data record. In the case of this embodiment, the test regions 25 should correspond to each other over multiple image data records.

The modified approach from FIGS. 10 and 11 essentially correspond to a so-called DSA (=digital subtraction angiography).

It is possible for the computer 10 uniformly to specify the reference image data record for all image data records 1 to 7 in the context of the step S20. In particular the image data record 1 illustrated in FIG. 1, i.e. the chronologically earliest image data record 1, this containing no contrast means, can be used as a reference image data record. Alternatively the computer 10 can specify the reference image data record for each image data record 1 to 7 individually. In particular, such an approach can be appropriate if image data records are present which were captured simultaneously or in rapid succession in accordance with the so-called dual-energy technology.

In the case of the approach in FIG. 11, for each image data element 9 of a selected image data record 1 to 7, a respective test region 25 is determined which is individually for the image data element 9 concerned. As an alternative to the approach described in connection with FIG. 11, according to FIG. 13 the selected image data record 1 to 7 can be divided into test regions 25 in a step S21. The test regions 25 which are generated in the context of the step S21 are disjoint and complementary. Their intersections are therefore mutually empty; the grouping of all test regions 25 corresponds to the relevant image data record 1 to 7 in its totality.

Figure 13:
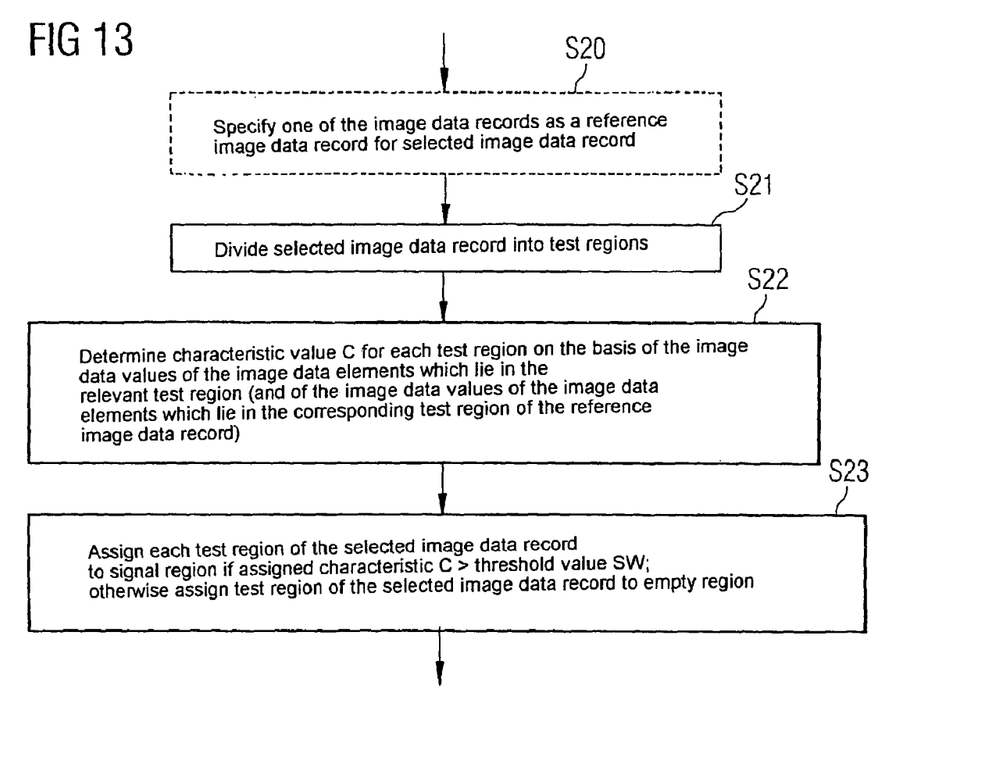
FIG. 13 shows a flow diagram.

In the case of the approach according to FIG. 13, in a step S22 the computer 10 determines a characteristic value C for each test region 25 on the basis of the image data values of the image data elements 9 which are located in the relevant test region 25 of the selected image data record 1 to 7. The characteristic value C can be, for example, the unweighted mean value or the maximum of the image data elements 9 contained in the relevant test region 25.

In a step S23, the computer 10 assigns the test regions 25 of the selected image data record 1 to 7 to the empty region 22 or the signal region 23. In the context of the step S23 and on the basis of a comparison between the characteristic value C and a threshold value SW, the computer 10 decides whether to assign the relevant test region 25 to the empty region 22 or the signal region 23.

The FIGS. 14 to 18 show possible test regions 25.

Figure 14:
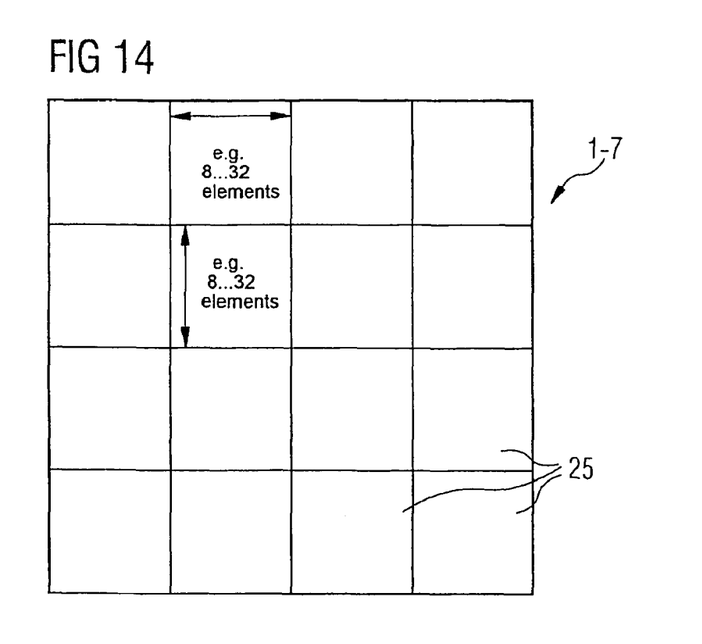
FIGS. 14 to 18 show test regions and
FIGS. 19 to 22 show flow diagrams.

According to FIG. 14, it is possible for each test region 25 to be greater than one in each dimension of the image data records 1 to 7. For example, the test regions 25 can be small rectangles (or small cubes in the case of three-dimensional image data records). Other (preferably regular) structures such as e.g. triangles or hexagons or (in the case of three-dimensional image data records 1 to 7) tetrahedrons or octahedrons are also possible.

Embodiments of the test regions 25 as illustrated in the FIGS. 15 to 18 are preferred. According to the FIGS. 15 and 16, the test regions 25 have the measurement one in at least one transverse direction—this is the x-direction in FIG. 15 and the y-direction in FIG. 16—of the multidimensional space.

Figure 15:
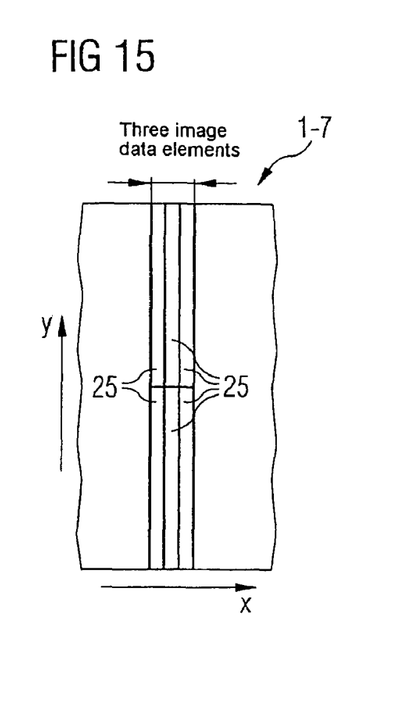
Figure 16:
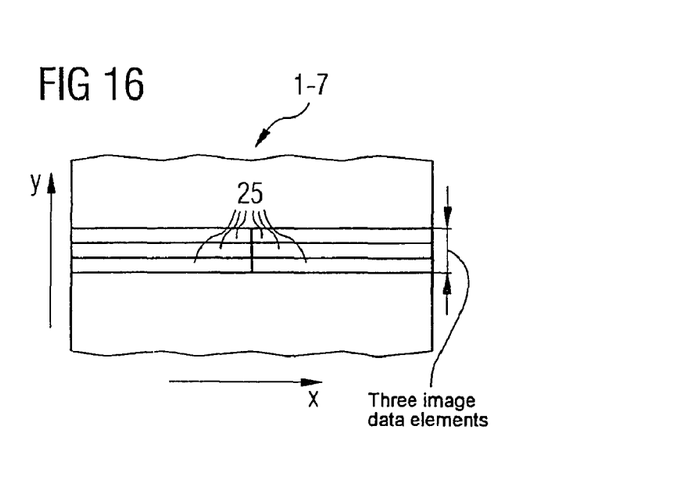

According to the FIGS. 15 and 16, the test regions 25 can only extend over a partial length of the multidimensional space in a longitudinal direction y, x which is orthogonal in relation to the transverse direction x, y. The test regions 25 preferably extend as per the illustrations in the FIGS. 17 and 18, but over the whole multidimensional space in the longitudinal direction y, x.

Figure 17:
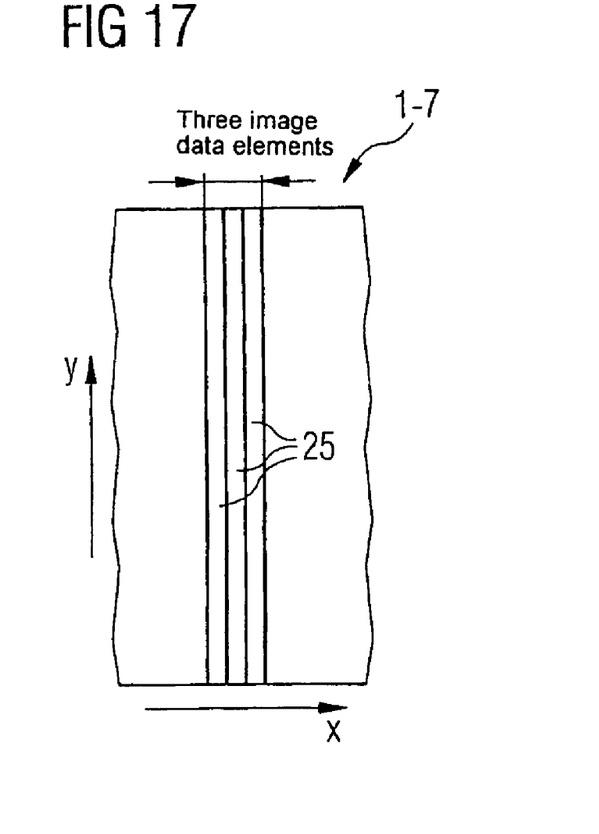
Figure 18:
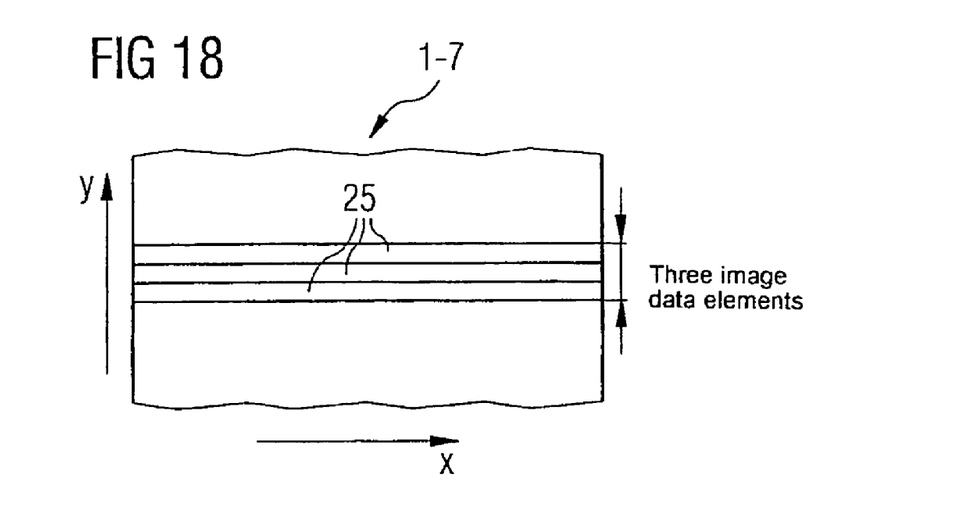

The test regions 25 from FIGS. 17 and 18 can have an extent of 1 in the transverse direction x, y. However, this is not obligatory.

In the present case, in which the image data records 1 to 7 are two-dimensional data records, the projection results in a reduction of one in the dimensionality. A projection in one dimension therefore occurs. If the image data records 1 to 7 are three-dimensional volume data records, it is also possible to produce a projection in one dimension. In this case, the projection mappings reduce the dimension of the image data records 1 to 7 by two dimensions. Alternatively, the projection mappings can reduce the dimension of the image data records 1 to 7 by only one dimension. A projection in two dimensions is produced in this case.

According to the illustrations in the FIGS. 15 to 17, the longitudinal direction and the transverse direction of the test regions 25 correspond to the directions of the position coordinates x, y. Such an approach is preferred since it is easiest to realize. However, it is not obligatory. In principle, the longitudinal direction and the relatively orthogonal transverse direction can be oriented as desired, e.g. diagonally.

Analogously to the FIGS. 10 and 11, in the embodiment according to FIG. 13 it is also possible for the determination of the characteristic values C to take place on the basis of the image data values of the image data elements 9 of the selected image data record 1 to 7 itself. Likewise analogously to the FIGS. 10 and 11, it is however alternatively possible firstly to specify a reference image data record in the step S20. The step S20 is still only optional, however, and is therefore only marked by means of a broken line again in FIG. 13.

The step S22 must be modified in this case. According to the modified step S22, in this case the computer 10 determines the characteristic value C for each test region 25 on the basis of the image data values of the image data elements 9 which are located in the relevant test region 25 of the selected image data record 1 to 7 and in the corresponding test region 25 of the reference image data record. Again in this case, the test regions 25 should correspond to each other over multiple image data records. The modification corresponds to the text in parentheses in the step S22.

Figure 19:
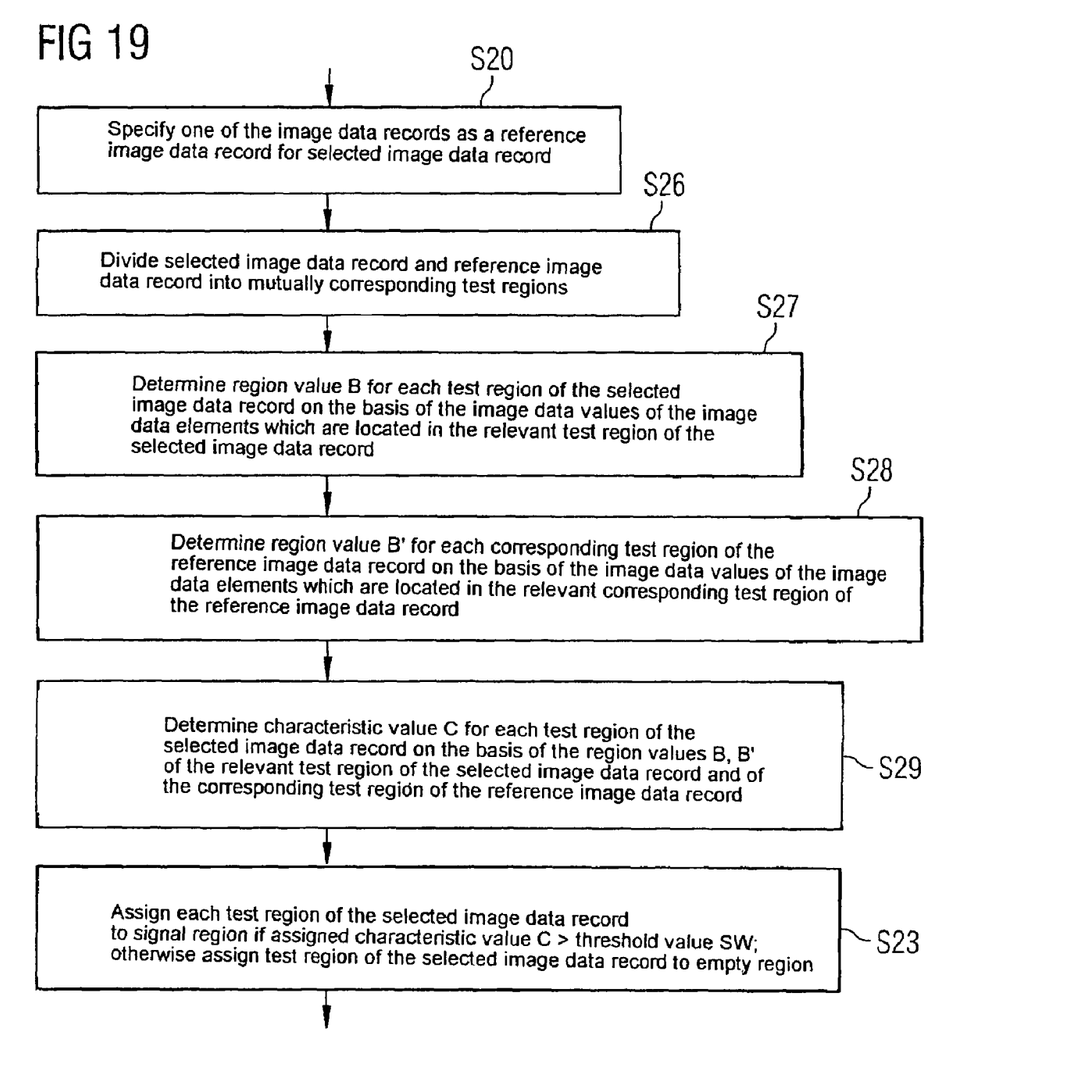

The approach in the FIG. 13 can be modified according to FIG. 19 as follows:

According to FIG. 19, the steps S21 and S22 are replaced by steps S26 to S29. The step S23 is retained. The step S20 is obligatory in the context of FIG. 19.

In the step S26, the computer 10 divides the selected image data record 1 to 7 and the reference image data record into mutually corresponding test regions 25.

In the step S27, the computer 10 determines a region value B for each test region 25 of the selected image data record 1 to 7 on the basis of the image data values of the image data elements 9 which are located in the relevant test region 25 of the selected image data record 1 to 7.

In the step S28, the computer 10 likewise determines a region value, this being designated below as B' for distinction, for each corresponding test region 25 of the reference image data record on the basis of the image data values of the image data elements 9 which are located in the relevant corresponding test region 25 of the reference image data record.

In the step S29, the computer 10 determines the characteristic value C for each test region 25 of the selected image data record 1 to 7 on the basis of the region values B, B' of the relevant test region 25 of the selected image data record 1 to 7 and of the corresponding test region 25 of the reference image data record.

The approach in FIG. 19 is particularly advantageous if the computer 10 specifies the reference image data record for all image data records 1 to 7 uniformly. It is then possible for the steps S20, S26 (if the reference image data record is affected) and S28 to be brought forward and only executed once for all image data records 1 to 7. In principle, however, the approach in FIG. 19 can also be applied if the computer 10 specifies the reference image data record for each image data record 1 to 7 individually.

Figure 20:
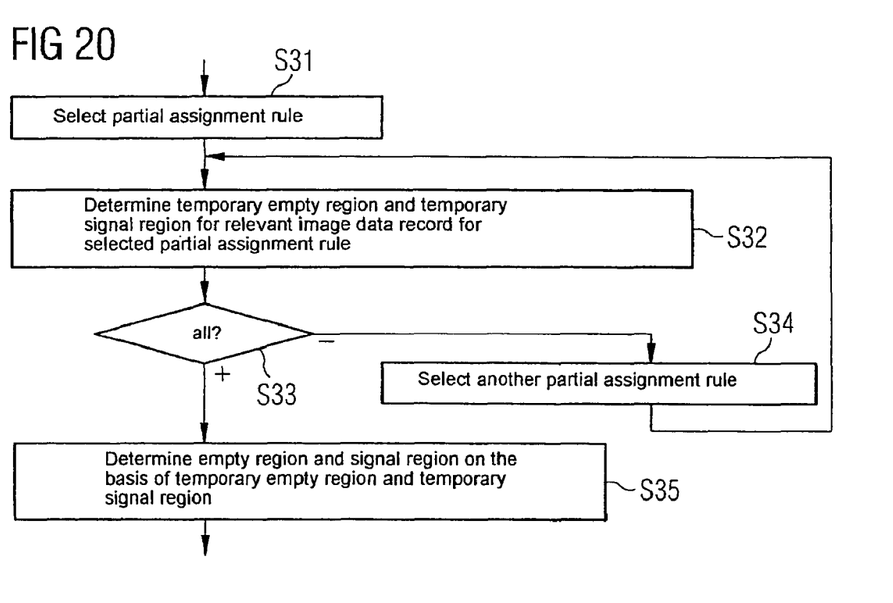
Figure 21:
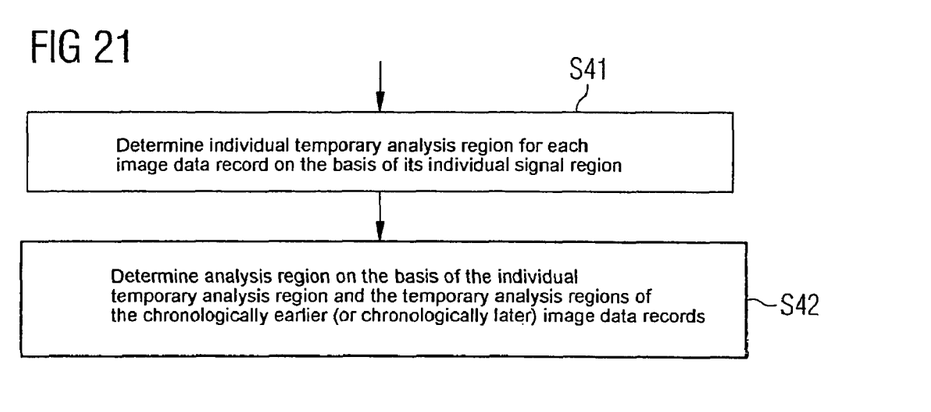
Figure 22:
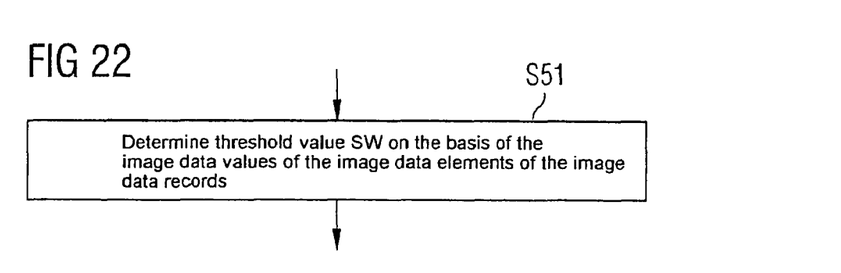

In the above description, a single assignment rule is used as a basis for deciding whether a specific image data element 9 is assigned to the empty region 22 or the signal region 23 of an image data record 1 to 7. However, it is also possible for the assignment rule to be a global assignment rule which comprises a plurality of partial assignment rules. In this case, it is possible to proceed as follows according to FIG. 20:

In a step S31, the computer 10 selects one of the partial assignment rules. In a step S32, the computer 10 determines a temporary empty region 22' and a temporary signal region 23' for the relevant image data record 1 to 7 for the selected partial assignment rule.

In a step S33, the computer 10 checks whether it has already processed all partial assignment rules. If this is not the case, in a step S34 the computer 10 selects another partial assignment rule and returns to the step S32.

Otherwise, in a step S35 the computer 10 determines the (now definitive) empty region 22' and the (likewise now definitive) signal region 23 on the basis of the temporary empty regions 22' and the temporary signal regions 23'.

Figure 7:
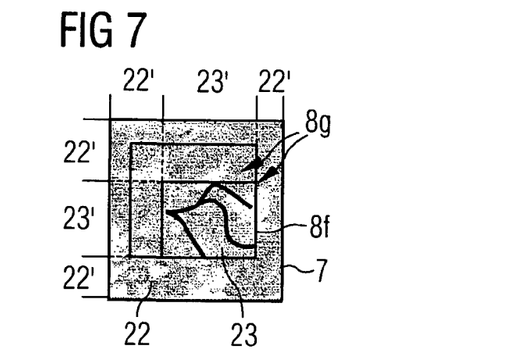

For example, in the context of a first partial assignment rule, the computer 10 can—c.f. FIG. 7, for example—divide the image data records 1 to 7 as per FIG. 17 and determine a temporary empty region 22' and a temporary signal region 23' for this division. In a second partial assignment rule, the computer 10 can divide the image data records 1 to 7 into test regions 25 as per FIG. 18 and determine a temporary empty region 22' and a temporary signal region 23' for the second partial assignment rule. If applicable, the computer 10 can additionally perform divisions into test regions 25 in further directions (e.g. diagonally from top left to bottom right and/or from bottom left to top right) and thus determine further temporary empty regions 22' and further temporary signal regions 23'.

The determination of the empty region 22 and signal region 23 in the step S35 is usually an intersecting operation or a grouping operation. For example, it is possible to determine the empty region 22 as a grouping of all temporary empty regions 22', or the signal region 23 as an intersection of all temporary signal regions 23'.

Other approaches are also possible. For example, it is possible to determine a temporary signal region 23' for each image data record 1 to 7 according to one of the approaches described above in conjunction with the FIGS. 10 to 19, and to group the signal regions 23' of all image data records 1 to 7 into an overall signal region 23. In this case, the signal region 23 is uniform for all image data records 1 to 7. The approach that is actually adopted depends on the individual case.

If the signal region 23 for all image data records 1 to 7 is uniformly specified, the closed outline 24 and the analysis region 8 for all image data records 1 to 7 are also uniform. However, it is preferable for at least the specification of the signal region 23 to take place individually for the image data record concerned.

Concerning the determination of the closed outline 24, similar approaches to those mentioned above in connection with the determination of the signal regions 23 are possible. It is therefore possible, for example, initially to determine a temporary closed outline on the basis of each temporary signal region 23' and to determine the definitive closed outline 24 on the basis of the temporary closed outlines. In particular, this approach is preferred in the case of the combined approach in the FIGS. 17 and 18 (i.e. the projection of the image data elements 9 in differing directions). In particular, in this case a corresponding temporary closed outline can initially be determined on the basis of each temporary signal region 23'. The definitive closed outline 24 can be determined e.g. as an intersection of the temporary closed outlines in this case.

Similarly, it is also possible initially to determine a temporary closed outline for each image data record 1 to 7 on the basis of its signal region 23, and to determine the definitive closed outline 24 e.g. as a grouping of the temporary closed outlines of the individual image data records 1 to 7. In this case, the closed outline 24 is uniform for all image data records 1 to 7. The analysis region 8 is also uniform for all image data records 1 to 7 in this case. However, a respective individual closed outline 24 is normally specified individually for each image data record 1 to 7 on the basis of its individually determined signal region 23.

Similarly, the analysis regions 8 of image data records 1 to 7 can also be determined on the basis of temporary analysis regions.

In the simplest case, the computer 10 determines the respective signal region 23 individually for each image data record 1 to 7, the closed outline 24 individually on the basis of the signal region 23, and the analysis region 8 individually on the basis of the closed outline 24. Examples of such analysis regions 8 are distinguished by the letters a to f in the FIGS. 2 to 6.

It is also clear from the above embodiments that—depending on the approach which is actually preferred—the analysis region 8 for all image data records 1 to 7 can be the same. For example, the analysis region 8 which is designated as 8*g* in FIG. 7 can be used as a shared analysis region 8.

In the present case, in which the image data records 1 to 7 form a chronological sequence, a further approach can be appropriate. In particular, according to FIG. 21, the computer 10 can initially determine a respective temporary analysis region for each image data record 1 to 7 on the basis of its individual signal region 23 in a step S41, and then determine its (definitive) analysis region 8 on the basis of the respective temporary analysis region and the temporary analysis regions of the chronologically earlier or chronologically later image data records 1 to 7 in a step S42.

In the approach according to the invention, the determined characteristic value C in each case is compared with a threshold value SW. In principle, the threshold value SW can be preset by the operator 21 or permanently preset in the computer 10. However, the computer 10 preferably determines the threshold value SW automatically in a step S51 as per FIG. 22. The determination in the step S51 preferably takes place on the basis of the image data values of the image data elements 9 of the image data records 1 to 7.

For example, in respect of each image data record 1 to 7, it is possible for the computer 10 to determine the maximum of the image data values of the image data elements 9 of the relevant image data record 1 to 7. In this case, the threshold value SW can be, for example, an appropriate percentage of the maximum, possibly with reference to a valid value range.

Alternatively, in respect of each image data record 1 to 7, the computer 10 can determine the mean value of the image data values of the image data elements 9 of the relevant image data record 1 to 7, and use this value or another value derived from the mean value as a threshold value SW. Other approaches are also possible.

Automatic specification of the analysis region 8 is easily possible by means of the present invention. No intervention is required on the part of the operator 21. Furthermore, subjective decision criteria are replaced by objective decision criteria, thereby eliminating the possibility of subjective errors in particular.

The above description serves solely to explain the present invention. However, the scope of protection of the present invention is specified solely by the appended claims.

The invention claimed is:

1. An analysis method for image data records of an examination object, comprising:
    providing image data records, wherein each image date record has a plurality of image data elements, wherein a position in a multidimensional space is assigned to each image data element, and wherein each image data element has an image data value, wherein the image data values of positionally corresponding image data elements of the image data records are specified by substantially positionally identical regions of the examination object;
    providing relevant image data records which include image data records of a region of the examination object in which a contrast agent has been introduced;
    dividing the relevant image data records into an empty region and a signal region by applying an overall assignment rule which is based upon the image data values of the image data elements of a plurality of image data records, such that each image data element of the relevant image data records is assigned to either the empty region or the signal region, wherein a size of the signal region changes over time as the contrast agent flows through the examination object;
    determining a closed outline fully containing the signal region of the relevant image data records wherein a size of the closed outline corresponds to the size of the signal region; and
    determining an analysis region based upon the closed outline of the relevant image data records to restrict a further analysis of the relevant image data record records to the analysis region wherein a size of the analysis region corresponds to the size of the closed outline thereby minimizing the size of the analysis region.

2. The analysis method as claimed in claim 1, wherein the determination of the closed outline and the determination of the analysis region is made automatically by a computer, wherein the computer further determines a characteristic value for each image data element of the image data record independently of the other image data elements of the relevant image data record, wherein the computer determines whether to assign the relevant image data element to a temporary empty region or to a temporary signal region based upon the characteristic value, and wherein the computer determines the empty region and the signal region based upon the temporary empty regions and the temporary signal regions.

3. The analysis method as claimed in claim 2, wherein the computer determines the characteristic value for each image data element of the image data record independently of the image data values of the other image data elements of the relevant image data record.

4. The analysis method as claimed in claim 2, wherein the computer determines a test region for the image data elements of the image data records, and wherein the computer determines the characteristic values which lie in the test region based upon the image data values of the image data elements of the image data records.

5. The analysis method as claimed in claim 4, wherein the test regions are greater than one in each dimension of the image data records.

6. The analysis method as claimed in claim 1, wherein the relevant image data record is divided into test regions, wherein for each test region a characteristic value is determined, wherein the relevant test region is assigned to a temporary empty region or a temporary signal region based upon the characteristic value, and wherein the empty region and the signal region are determined based upon the temporary empty regions and the temporary signal regions.

7. The analysis method as claimed in claim 6, wherein each test region is greater than one in each dimension of the image data records.

8. The analysis method as claimed in claim 6, wherein the test regions have a measurement of one in at least one transverse direction of the multidimensional space.

9. The analysis method as claimed in claim 7, wherein the test regions extend over the whole multidimensional space in at least a longitudinal direction.

10. The analysis method as claimed in claim 4, wherein the test regions correspond to each other based upon multiple image data records.

11. The analysis method as claimed in claim 10, wherein the computer specifies one of the image data records as a reference image data record for one of the plurality of image data records, wherein the computer determines a region value for each test region of each image data record based upon the image data values of the image data elements of the relevant test region, and wherein the computer determines the characteristic value for each test region based upon the region values of the relevant test region of the relevant image data record and of the region value of the corresponding test region of the reference image data record.

12. The analysis method as claimed in claim 2, wherein the computer determines one of the image data records as a reference image data record for each image data record, and wherein the computer determines the characteristic values of the relevant image data record based upon the image data values of the image data elements of the relevant image data record and of the reference image data record.

13. The analysis method as claimed in claim 11, wherein the computer determines the reference image data record for all image data records uniformly.

14. The analysis method as claimed in claim 11, wherein the computer specifies the reference image data record for each image data record individually.

15. The analysis method as claimed in claim 2, wherein the computer compares the characteristic values with at least one threshold value, and wherein the computer automatically determines the at least one threshold value based upon the image data values of the image data elements of the image data records.

16. The analysis method as claimed in claim 1, wherein the image data records are registered relative to each other.

17. The analysis method as claimed in claim 1, wherein at least two temporary closed outlines per image data record are determined, and wherein the closed outline for each image data record are determined based upon the temporary closed outlines.

18. The analysis method as claimed in claim 1, wherein at least two temporary analysis regions per image data record are determined, and wherein the analysis region is determined based upon the temporary analysis regions.

19. The analysis method as claimed in claim 1, wherein for each image data record the respective signal region is determined, wherein the respective closed outline is determined based upon the determined signal region, and wherein the analysis region is determined based upon the determined closed outline.

20. The analysis method as claimed in claim 1, wherein the analysis region for all image data records is specified uniformly.

21. The analysis method as claimed in claim 1, wherein the image data records form a chronological sequence, wherein a computer determines the respective analysis region for a specific one of the image data records based upon the signal region of the specific image data record and of the signal regions of the image data records that lie chronologically before or after the specific image data record.

* * * * *